United States Patent Office 3,437,343
Patented Apr. 8, 1969

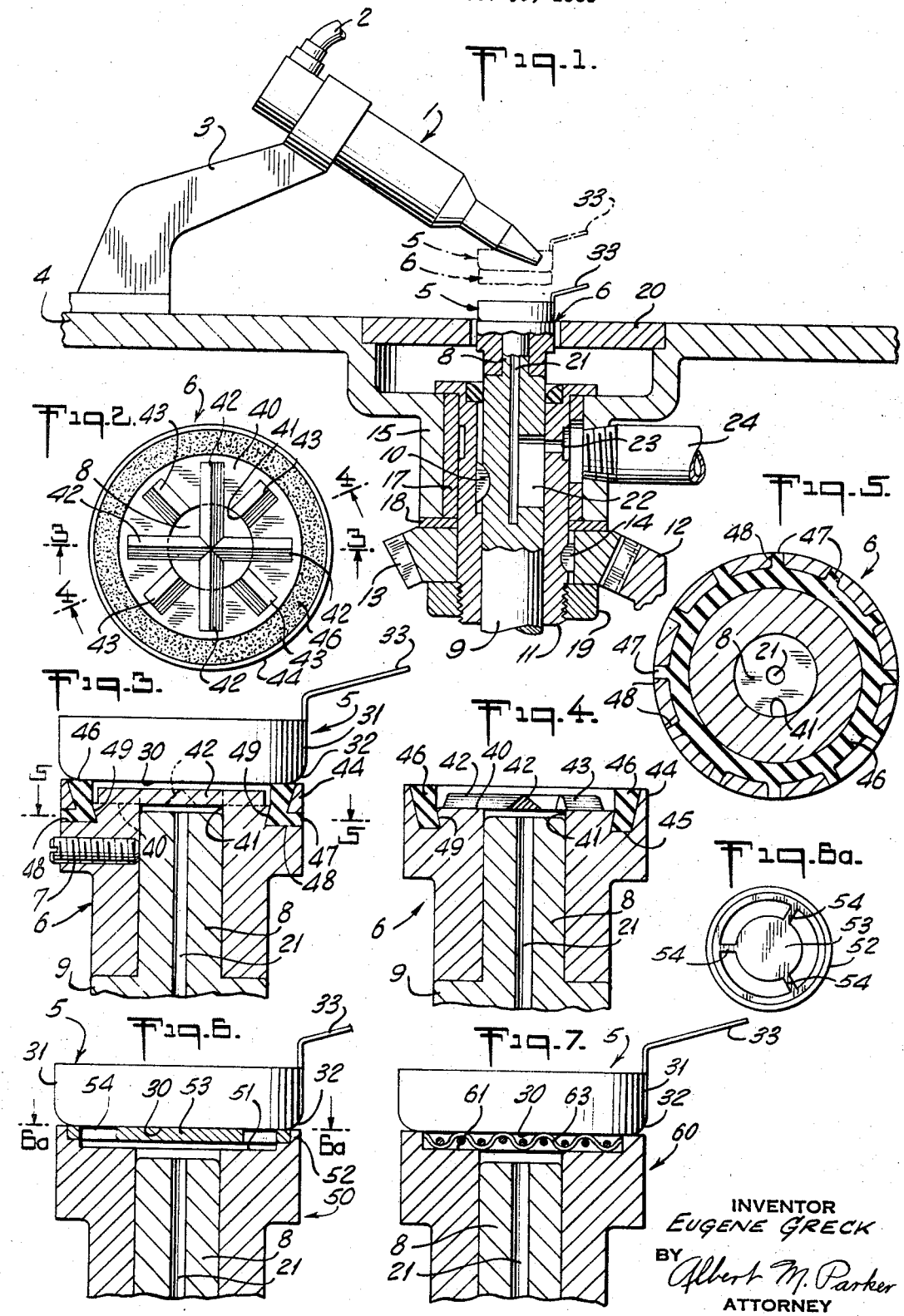

3,437,343
GASKETING APPARATUS
Eugene Greck, Westfield, N.J., assignor to American Flange & Manufacturing Co., Inc., New York, N.Y., a corporation of Delaware
Filed Dec. 30, 1965, Ser. No. 517,651
Int. Cl. B23b 31/30, 5/22, 31/10
U.S. Cl. 279—3          1 Claim

ABSTRACT OF THE DISCLOSURE

A closure gasketing apparatus for applying a semi-liquid flowed in lining compound to cup shaped closure members. A vacuum chuck is provided for gripping the closure member and spinning it at high speeds below a lining nozzle as the lining is applied to the interior of the closure member.

---

This invention relates to the gasketing of container closures and is particularly concerned with an improved lining chuck to hold closures so that they may be rapidly rotated during the application of a flowed in gasket.

This invention constitutes an improvement in a closure gasketing arrangement wherein a gasket is formed in situ within the closure by the application of a semi-liquid gasketing material which is subsequently heat cured into a resilient gasket. In one type of lining apparatus, the closure is positioned on a rapidly rotating lining chuck and the chuck, while rapidly rotating, is moved into operative position relative to a lining nozzle which then dispenses a measured amount of semi-liquid lining compound into the closure. In such an apparatus it is essential that the closure be properly centered on the lining chuck and securely held in such position during the rapid rotation in order to assure that the compound will be accurately applied. A limiting factor heretofore encountered in efforts to achieve higher speeds in this type of lining operation has been the speed at which the lining chuck can be rotated while holding the closure securely thereon. The additional centrifugal force created by increasing the speed of prior art lining chucks tends to throw the closure off of the chuck during the operation. Even if the closure is not thrown completely off the chuck, any slippage occurring between the closure and the chuck is equally undesirable since the closure is not centered on the chuck which prevents the accurate application of the gasket in the closure and also prevents the formation of a uniform gasket contour.

In the prior art the chucks for holding closures are of the magnetic or the vacuum type. If the closures are made of aluminum the magnetic type of chuck is unworkable. If, as in the instant invention, the closure is unsymmetrical in design, the vacuum force required to retain the closure firmly in place and centered on the chuck is greatly increased.

The solution to this problem as herein disclosed is embodied in a new and improved vacuum lining chuck capable of exerting a far greater and more effective holding force than heretofore achieved. In designing a vacuum lining chuck having the necessary holding power it should also be kept in mind that the closure must be accurately seated upon and easily removed from the chuck seat at a high rate of speed. This handling of the cap during the lining operation in itself presents further difficulties overcome by the invention. Rapid and accurate positioning of the closure on the lining chuck seat is essential. The holding force must be applied in such a manner that the closure can slide across the chuck to its fully seated position without excessive tilting or twisting as the holding force is applied thereto. Once the closure is fully seated on the chuck it must be tightly and accurately held in place under the full holding power of the chuck. Thus held the closure not only effectively withstands the centrifugal force attempting to dislodge it but in addition it is tightly gripped with its top surface disposed in a flat horizontal plane so that any warping or distortion which might find its way into the closure during either its manufatcure or handling prior to lining, will be flattened out and rendered harmless as the gasket is applied. The apparatus hereinafter disclosed results in both an improved closure due to the accurately placed and uniform gasket contour as well as a faster and more efficient gasketing operation.

It is accordingly a principal object of this invention to provide improved apparatus for the lining of closures.

Another object is to provide apparatus for the high speed lining of lightweight aluminum closures.

Still another object is to provide a new and improved vacuum chuck for lining closures.

A further object is to provide an improved closure lining chuck having increased vacuum holding power.

Further and more detailed objects will in part be obvious and in part pointed out as the description of the invention taken in conjunction with the accompanying drawing proceeds.

In that drawing:

FIG. 1 is a vertical sectional view of the lining nozzle, lining chuck and actuating mechanism therefor;

FIG. 2 is an enlarged top plan view of the principal embodiment of the lining chuck of the invention;

FIG. 3 is a vertical sectional view taken on lines 3—3 on FIG. 2 and looking in the direction of the arrows;

FIG. 4 is a vertical sectional view taken on lines 4—4 on FIG. 2, and looking in the direction of the arrows;

FIG. 5 is a horizontal sectional view taken on lines 5—5 on FIG. 3 and looking in the direction of the arrows;

FIG. 6 is a vertical sectional view similar to FIG. 3 showing an alternate form of lining chuck;

FIG. 6a is a top plan view of alternate form of lining chuck shown in FIG. 6; and FIG. 7 is a vertical elevational view similar to FIG. 3 and showing another alternate form of lining chuck.

In the gasketing apparatus shown in FIG. 1 a lining nozzle 1, fed by supply line 2, is held in a stationary position by a support member 3 fixed to table 4. The closure member 5 is raised into a position adjacent the end of nozzle 1 to receive the lining compound by means of a lining chuck comprising a seat member 6 secured by means of a set screw 7, as seen in FIG. 3, to the reduced upper end 8 of a rotating and vertically reciprocating shaft 9. The shaft 9 is slideably keyed at 10 to a sleeve 11 which surrounds the upper portion thereof. The lower end of shaft 9 is operatively connected to an actuating means (not shown) for vertical reciprocation within the sleeve 11. The sleeve 11 and consequently the shaft 9 are rotated by the ring gear 12 which drives the pinion 13 keyed at 14 to sleeve 11. Thus the shaft 9 and the sleeve 11 are rotated together while the shaft 9 can at the same time be reciprocated in that sleeve. The chuck actuating and driving assembly is carried within a sleeve 15 forming part of housing 16, and is retained in said sleeve through intervening bearing members 17 and 18 by means of locknut 19. The housing 16 is integrally formed about an opening in the table 4. A removable access plate 20 having an opening slightly larger than the chuck seat 6 is inserted into said table opening to form a continuation of the upper surface of table 4. Vacuum is drawn through the chuck seat 6 by means of a bore 21 extending through the upper portion of shaft 9 which communicates with an annular elongated port 22 formed in the outer surface of shaft 9. An annular opening 23 in the circumference of the rotating sleeve 11 is aligned with and communicates with the port 22. A vacuum pipe 24, connected to a source of vacuum (not shown), extends through the housing sleeve 15 and bearing 17 and communicates with the opening 23 in the sleeve 11. The port 22 has a length equal to the length of the reciprocating stroke of the shaft 9 so that a constant vacuum is provided in the bore 21 of said shaft. A rubber seal 25 carried at the upper end of sleeve 11 seals against the shaft 9 to prevent loss of vacuum therebetween.

In operation the shaft 9, and consequently the chuck seat 6, are rotated while a vacuum is continuously drawn therethrough so that as a closure 5 is pushed onto the chuck seat 6 it is retained thereon. As the shaft is rotated an intermittent vertical reciprocating motion is also imparted thereto so that the closure is raised above the top surface of the plate 20 into lining position adjacent the end of nozzle 1 as shown in dot dash lines in FIG. 1. The nozzle 1 is of the electropneumatic type such as manufactured by the Dewey and Almy Division of W. R. Grace Company and sold under the trade name "Darex." The nozzle is actuated, through a series of conventional electrical switches, in timed relation to the upward movement of the chuck seat 6 so that a metered amount of semi-liquid gasketing compound is ejected into the raised rotating closure. The lined closure is then lowered to the plane of the top surface of table 4 and removed from the rotating chuck.

Of particular importance in achieving the objects of the invention is the specific construction of the lining chuck seat generally indicated at 6 in FIG. 1 and shown in detail in FIGS. 2 through 5. In order to increase the working efficiency and overall productivity of the above described lining operation, higher operating speeds have been sought. A limiting factor in this regard has been, until the development of the present invention, the speed at which the lining chuck can be rotated without throwing the closure off of the chuck seat due to the resulting centrifugal force. Not only must the holding force exerted by the chuck prevent dislodgment of the closure but any relative movement at all between the chuck and the closure during the application of the lining compound must be prevented to avoid a deleterious effect on the finished gasket form. The closure 5, herein illustrated in conjunction with the description of the new and improved lining chuck, is formed of lightweight aluminum and comprises a flat circular panel 30 surrounded by an integral outwardly extending cylindrical skirt 31 with the juncture of said skirt and flat panel forming an annular radiused portion 32. A gripping ear 33 extends radially outwardly from the free edge of the skirt 31. The lack of symmetry in the closure due to the presence of the ear 33, plus the fact that the lining compound is injected under pressure in a radial direction into the annular juncture portion 32, creates unbalancing forces which must be overcome by additional vacuum holding power. The vacuum chuck of the invention supplies the necessary additional holding force by applying a vacuum over a substantial area of the closure panel 31.

The chuck seat 6 of the improved lining chuck is provided with a central bore 41 which is fitted over the end portion 8 of the shaft 9. The outer end surface of the chuck seat 6 is provided with an annular recess 40, the central portion of which extends into and communicates with the central bore 41. The remaining portion of the outer end surface of the chuck seat forms an annular rim 44, the outer surface of which is formed by the peripherial surface of the chuck seat and inner surface of which is tapered downwardly to a thickened portion adjacent the bottom surface of recess 40. Four interconnected radially extending ribs 42 are formed on the bottom surface of the recess 40. Ribs 42 extend across the end of bore 41, intersect at the center of said bore and the end of each said rib terminates at a point spaced from the rib 44. Four additional ribs 43 are formed on the bottom surface of the recess 40 and radially extend from the edge of bore 41 and terminate at a point spaced from the rim 44 and are positioned between the ribs 42. Both series of ribs 42 and 43 are triangular in cross sectional configuration, as more clearly shown in FIG. 4, and extend upwardly from the bottom surface of recess 40 a distance less than the depth of rim 44 so that the upper surface of said rim extends above the upper surface of each of said ribs. An annular groove 45 is formed into the bottom surface of recess 40 adjacent the rim 44. The inner surface 49 of the groove 45 is undercut in a plane parallel to the inner surface of rim 44. A plurality of radially extending bores 48 are spaced about the periphery of the chuck seat, each of which extends from the outer surface of the chuck seat to the bottom surface of the groove 45. A molded vinyl plastic ring 46 is formed in the groove 45 and radial bores 48 and extends upwardly in contact with the inner surface of rim 44 to a position adjacent the upper surface of said rim. Ring 46 is molded directly into the chuck seat and is firmly held in the groove 45 by the undercut surface 49 and the integral fingers 47 formed by the plastic material filling the radial bores 48. The function of the vinyl plastic ring 46 is to provide a relatively high coefficient of friction between the chuck and the closure panel 32 in order to minimize slippage.

In the form of the invention shown in FIGS. 2 through 5 it can readily be seen that the vacuum drawn through the passage 21 and recess 40 is applied against almost the entire surface of the panel 30 so that the total holding force is substantial. It is also important to note that this force is applied to the panel 30 near its periphery so that any warping or distortion of the closure, which might otherwise adversely affect the gasket in finished form, is overcome at this point.

Increased holding force alone is not the key to an effective high speed lining operation. It is essential that the placement and removal of the closure on the chuck be carried out rapidly and with a high degree of accuracy. In the form of apparatus as shown in FIG. 1 the closures are moved along the upper surface of table 4 and plate 20, for moving onto and away from the chuck seat 6. The movement of the closures is so timed relative to the vertical reciprocating movement of the chuck seat that they move on and off the chuck seat when said chuck seat is horizontally aligned with the upper surface of table 4 and plate 20. As each closure is pushed onto the chuck seat the vacuum holding force is applied gradually to the panel 30 as the recess 40 bordered by the ring 46 is progressively closed off. This allows the closure to easily slide across the chucking surface until it is accurately placed in its fully seated position whereupon the full vacuum holding force of the chuck becomes effective. Furthermore as the closure is moved across the upper surface of the chuck seat it must be held in a relatively flat plane in order to effect the degree of control necessary. In order to prevent the closure from tilting and twisting excessively as it slides across the top of the recess 40 the closure is supported or guided during its travel across the top of the chuck seat by the ribs 42 and 43. Removal of the lined closure from the rotating chuck is also facilitated by the chuck design of the invention in that as soon as the closure starts to move off of the chuck seat the vacuum holding force is broken and is greatly diminished. The closure can then be easily completely removed from the chuck seat without becoming marred or otherwise damaged.

In the form of the invention shown in FIGS. 6 and 6a the chuck seat 50 has an annular recess 51 bordered by an upstanding rim 52. A disc 53 is suspended in the center of recess 51 by a plurality of radially extending integral fingers 54 which in turn are supported at their outer ends on a ledge 52a on the inner surface of the rim 52. The lining chuck of FIGS. 6 embodies most of the advantageous features set forth in connection with the chuck shown in FIGS. 2 through 5 except that in this modification the vacuum is only applied to the closure panel 30 in an annular peripheral zone. This construction still allows a relatively large area of the panel 30 to be acted upon by the vacuum and the holding force thus created is applied near the periphery of the panel 30 where it is most effective.

A further modified form of chuck seat is shown in FIG. 7 and has a porous screen 63 secured within the annular recess 61 and bordered by the upstanding peripheral rim 62. The screen 63, like the ribs 42 and 43 in the principal form of the chuck seat, supports the closure 30 in a flat plane while allowing the major portion of the panel area 30 to be acted upon by the vacuum.

Other and different variations of the invention may well suggest themselves to those skilled in the art without departing from the scope and spirit of the invention. It is accordingly to be understood that the apparatus shown in the accompanying drawing and described in the foregoing description is to be considered as illustrative of the invention and is not to be considered as being set forth in a limiting sense.

Having described my invention what I claim is new and desire to secure by Letters Patent is:

1. A rotatable vacuum chuck for lining container closures, said chuck comprising a horizontally disposed circular chucking surface having a diameter substantially equal to the diameter of the closure, said chucking surface including a central circular area surrounded by an integral narrow closure supporting rim, rigid closure guide means closely arranged throughout said entire central area, said guide means projecting upwardly and lying in the horizontal plane of said rim so that the major portion of said central area is recessed below said guide means, said guide means terminating in their upward extent in a series of points as viewed in vertical cross section whereby minimal surface contact is made with said closure, vacuum means connected to the center of said chuck and communicating radially with said central area for holding said closure in engagement with said chucking surface, recessed vacuum passages formed by said guide means within said central area, said vacuum passages intercommunicating with each other to form a single subatmospheric pressure chamber whereby said vacuum holding force is equally distributed throughout said central area and is substantially ineffective as long as any portion of said central area is exposed to the atmosphere.

References Cited

UNITED STATES PATENTS

| | | | |
|---|---|---|---|
| 1,275,569 | 8/1918 | Hodny et al. | 51—235 |
| 2,443,987 | 6/1948 | Morrison et al. | 279—3 X |
| 2,679,713 | 6/1954 | Lytle | 279—3 X |
| 2,955,829 | 10/1960 | Brewster | 279—3 |
| 3,052,479 | 9/1962 | Trell | 279—3 |
| 3,294,392 | 12/1966 | Dunham | 51—235 X |
| 2,807,180 | 9/1957 | Adams | 279—3 X |

ROBERT C. RIORDON, *Primary Examiner.*

J. C. PETERS, *Assistant Examiner.*